United States Patent
Kim et al.

(10) Patent No.: US 10,605,359 B2
(45) Date of Patent: Mar. 31, 2020

(54) SHIFT CONTROL SYSTEM FOR VEHICLE

(71) Applicant: TOYOTA JIDOSHA KABUSHIKI KAISHA, Toyota-shi, Aichi-ken (JP)

(72) Inventors: Jonggap Kim, Hadano (JP); Kazumi Hoshiya, Gotemba (JP); Atsuhiko Yokota, Gotemba (JP); Satoshi Yamanaka, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/198,025

(22) Filed: Nov. 21, 2018

(65) Prior Publication Data
US 2019/0170245 A1 Jun. 6, 2019

(30) Foreign Application Priority Data
Dec. 5, 2017 (JP) .................. 2017-233447

(51) Int. Cl.
| F16H 61/04 | (2006.01) |
| F16H 61/02 | (2006.01) |
| F16H 59/70 | (2006.01) |
| F16H 59/42 | (2006.01) |

(52) U.S. Cl.
CPC ......... *F16H 61/04* (2013.01); *F16H 61/0213* (2013.01); *F16H 61/0437* (2013.01); *F16H 59/42* (2013.01); *F16H 59/70* (2013.01); *F16H 2061/0444* (2013.01)

(58) Field of Classification Search
CPC .......... F16H 59/42; F16H 59/44; F16H 59/70; F16H 61/0213; F16H 61/04; F16H 61/0437; F16H 2061/0444
See application file for complete search history.

(56) References Cited

U.S. PATENT DOCUMENTS

| 5,946,984 A * | 9/1999 | Nitsche .................. F16D 33/06 370/352 |
| 5,961,421 A * | 10/1999 | Hoshiya ................ F16H 61/061 477/140 |
| 9,249,881 B1 * | 2/2016 | Monajemi ............... F16H 61/04 |
| 2008/0161159 A1 * | 7/2008 | Runde ..................... F16H 61/12 477/156 |
| 2013/0218394 A1 | 8/2013 | Kanayama et al. |
| 2016/0076639 A1 * | 3/2016 | Uchida ............... F16H 61/0213 477/3 |

FOREIGN PATENT DOCUMENTS

WO  2012/059996 A1  5/2012

* cited by examiner

*Primary Examiner* — Edwin A Young
(74) *Attorney, Agent, or Firm* — Oliff PLC

(57) ABSTRACT

A shift control device for establishing a desired gear stage promptly while reducing a shock, during propulsion while disengaging all of engagement devices of a transmission. The shift control system compares a target stage set based on an operating data to an interim stage set based on the operating data immediately before the target stage is set. If the target stage is lower than the initial stage the engagement devices are engaged to establish the target stage without establishing the initial stage.

9 Claims, 7 Drawing Sheets

|  | K1 | K2 | K3 | K4 | B1 | B2 |
|---|---|---|---|---|---|---|
| 1st | O | O |  |  |  | O |
| 2nd | O |  |  |  | O | O |
| 3rd |  | O |  |  | O | O |
| 4th |  |  |  | O | O | O |
| 5th |  | O |  | O | O |  |
| 6th | O |  |  | O | O |  |
| 7th | O |  | O | O |  |  |
| 8th |  |  | O | O | O |  |
| 9th | O |  | O |  | O |  |
| 10th |  | O | O |  | O |  |
| Rev |  | O | O |  |  | O |

(Example of Normal Shifting from 10th to 4th)

Downshifting ↑ / Interim Stage →

| | K1 | K2 | K3 | K4 | B1 | B2 |
|---|---|---|---|---|---|---|
| 4th | | | | O | O | O |
| 5th | | O | | O | O | |
| 8th | | | O | O | O | |
| 10th | | O | O | | O | |
| EV | | | | | | |

Downshifting ↑ / Interim Stage →

| Gear Stage | K1 | K2 | K3 | K4 | B1 | B2 |
|---|---|---|---|---|---|---|
| 4th | | | | O | O | ④ |
| 5th | | O | | ③ | O | |
| 10th | | ① | O | | ② | |
| EV | | | | | | |

SHIFT CONTROL SYSTEM FOR VEHICLE

CROSS REFERENCE TO RELATED APPLICATIONS

The present disclosure claims the benefit of Japanese Patent Application No. 2017-233447 filed on Dec. 5, 2017 with the Japanese Patent Office, the disclosure of which are incorporated herein by reference in its entirety.

BACKGROUND

Field of the Disclosure

Embodiments of the present disclosure relate to the art of a shift control system for a vehicle comprises an automatic transmission in which a plurality of gear stages can be established by manipulating a clutch and a brake.

Discussion of the Related Art

PCT international publication WO 2012/059996 A1 describes a hybrid vehicle having a connection/disconnection device for selectively transmitting torques of an engine and a first rotating machine to drive wheels while changing a magnitude. In the hybrid vehicle of this kind, a drive force of the drive wheel may be changed by such change in the transmission torque caused by engaging or disengaging the connection/disconnection device, and consequently a shock would be generated. According to the teachings of WO 2012/059996 A1, therefore, the connection/disconnection device does not start transmitting the torque simultaneously with starting the engine. Specifically, a shift mode of an operating mode is selected from a first shift mode in which the connection/disconnection device is connected after cranking the engine by the first rotating machine, and a second shift mode in which the engine is started after connecting the connection/disconnection device.

Thus, in the hybrid vehicle taught by WO 2012/059996 A1, shocks may be reduced and a drive response may be improved by controlling an order to start the engine and to connect the connection/disconnection device. Such control taught by WO 2012/059996 A1 may be applied to a conventional automatic transmission having a plurality of clutches and brakes including an input clutch for selectively delivering a torque to the transmission. However, a technique for manipulating a plurality of engagement devices to transmit torque while changing the torque is not known in the art. Especially, a technique for establishing a desired gear stage by disengaging all of the engagement devices and thereafter engaging a plurality of engagement devices is not known in the art.

SUMMARY

Aspects of embodiments of the present disclosure have been conceived noting the foregoing technical problems, and it is therefore an object of the present disclosure to provide a shift control device for a vehicle configured to establish a desired gear stage promptly by engaging engagement devices of a transmission while reducing a shock, during propulsion while disengaging all of the engagement devices.

The shift control system according to the embodiment of the present disclosure is applied to a vehicle an automatic transmission connected to an output side of a prime mover. In the automatic transmission, a gear stage is selected from a plurality of stages by manipulating a plurality of engagement devices. The shift control system is provided with a controller that controls engagement and disengagement of the engagement devices. In order to achieve the above-explained objective, the controller is configured to: compute a target stage based on an operating data including a vehicle speed; determine whether the target stage computed during propulsion while disengaging all of the engagement devices is lower than an initial stage computed based on the operating data immediately before the target stage is computed; and engage the engagement devices to establish the target stage without establishing the initial stage, when the target stage is lower than the initial stage.

In a non-limiting embodiment, the controller may be further configured to: compute an interim stage, in which a speed ratio is greater than the speed ratio in the initial stage but smaller than the speed ratio in the target stage, which can be shifted from the initial stage by engaging one of the engagement devices and disengaging another one of the engagement devices, and which can be shifted to the target stage by engaging one of the engagement devices and disengaging another one of the engagement devices; and engage the engagement device to establish the interim stage in the process of establishing the target stage during propulsion while disengaging all of the engagement devices, if the interim stage is available.

In a non-limiting embodiment, the controller may be further configured to select the interim stage in which a speed ratio is closer to a speed ratio of the target stage if a plurality of the interim stages is available.

In a non-limiting embodiment, the controller may be further configured to engage the engagement devices to shift the gear stage from the initial stage to the target stage via an intermediate stage during propulsion while disengaging all of the engagement devices, in the order of: a first engagement device that is engaged in all of the initial stage, the intermediate stage, and the target stage; a second engagement device that is engaged in the intermediate stage and the target stage; and a third engagement device that is engaged only in the target stage when shifting the gear stage from the intermediate stage.

In a non-limiting embodiment, the controller may be further configured to: obtain an input speed to the automatic transmission; engage a driving force maintaining clutch that is engaged in the interim stage but disengaged in the target stage; and maintain a predetermined torque transmitting capacity of the driving force maintaining clutch during increasing the input speed from a synchronous speed in the interim stage to a synchronous speed in the target stage.

In a non-limiting embodiment, the controller may be further configured to engage the engagement devices to shift the gear stage from the initial stage to the target stage via the intermediate stage at different timings, if orders of some of the engagement devices are set to the same order.

According to the embodiment of the present disclosure, the target stage set based on the operating data including the vehicle speed is compared to the initial stage set based on the operating data immediately before the target stage is set. When establishing a predetermined gear stage by engaging any of the engagement devices during propulsion while disengaging all of the engagement devices, if the gear stage to be established is the target stage, and is lower than the initial stage, the engagement devices are engaged in such a manner as to establish the target stage without establishing the initial stage. Thus, according to the embodiment of the present disclosure, the gear stage is shifted directly to the target stage without executing the control for establishing the interim stage. According to the embodiment of the present disclosure, therefore, a shifting response or a control response of the driving force can be improved. In addition, the shifting operations will not be executed simultaneously or the shifting operation will not be executed continuously. For this reason, a shift shock can be reduced. Further, since all of the engagement devices can be disengaged during propulsion of the vehicle, an engagement device for delivering torque to the transmission (i.e., an input engagement device) and a torque converter may be eliminated from the transmission.

In addition, acceleration may be generated earlier to improve an acceleration response by temporarily engaging the engagement device for establishing the interim stage to shift the gear stage to the target stage via the interim stage. Especially, if the interim stage is close to the target stage, the speed ratio of in the interim stage is large so that the acceleration response is further improved.

Since the order to engage the engagement devices are determined, a rotational speed of a rotary member of the transmission is reduced or increased gradually. That is, a rotational direction of the rotary member of the transmission will not be reversed, or the rotational speed of the rotary member of the transmission will not be changed abruptly. For this reason, the shift shock may be further reduced.

Further, torque transmitting capacity of the engagement device engaged in the interim stage but to be disengaged in the target stage is maintained to a predetermined capacity until the input speed to the transmission reaches the synchronous speed in the target speed. According to the embodiment of the present disclosure, therefore, the acceleration can be increased continuously in the process of establishing the target stage during propulsion while disengaging all of the engagement devices. In addition, a driver is allowed to sense an increase in the acceleration at an earlier timing. That is, the acceleration response may be further improved.

Furthermore, if engagement orders of some of the engagement devices are set to the same order, those engagement devices are engaged at different timings. According to the embodiment of the present disclosure, therefore, the shift shock may be further reduced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
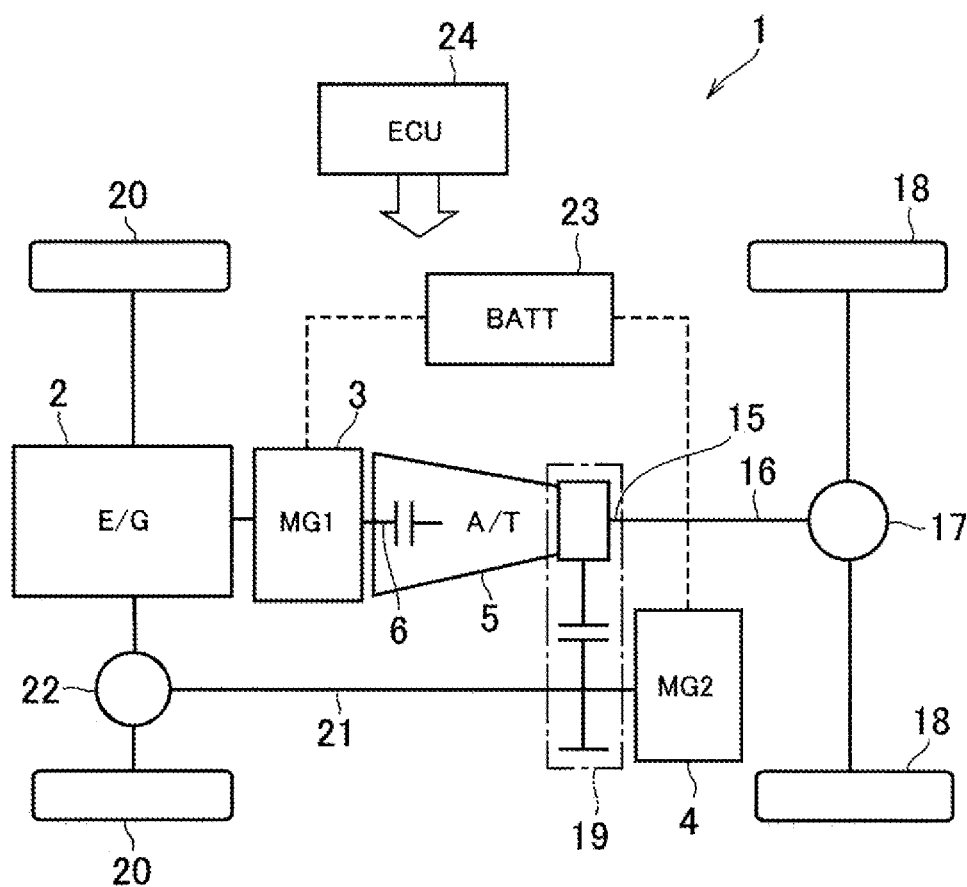
FIG. 1 is a schematic illustration showing one example of a structure of a hybrid vehicle to which the shift control system according to the embodiment of the present disclosure is applied.

Embodiments of the present disclosure will now be explained with reference to the accompanying drawings. The shift control system according to the embodiment of the present disclosure may be applied to a vehicle comprising a transmission in which a gear stage may be selected from a plurality of stages by manipulating a plurality of engagement devices such as a clutch and a brake. In the vehicle of this kind, the transmission is connected to an output side of a prime mover, and the prime mover may comprise an internal combustion engine and a motor-generator. Turning now to FIG. 1, there is shown a structure of a hybrid vehicle (as will be simply called the "vehicle" hereinafter) 1 to which the shift control system according to the embodiment is applied. The vehicle 1 is a front-engine/rear-drive layout four-wheel drive vehicle in which an engine (referred to as "E/G" in FIG. 1) 2 is arranged in a front section of the vehicle 1. In the vehicle 1, a first motor (referred to as "MG1" in FIG. 1) 3 and an automatic transmission (referred to as "A/T" in FIG. 1) 5 are arranged downstream of the engine 2. Specifically, an output shaft of the engine 2 and a rotor shaft of the first motor 3 are connected to an input shaft 6 of the automatic transmission (as will be simply called the "transmission" hereinafter) 5.

For example, an internal combustion engine such as a gasoline engine and a diesel engine may be used as the engine 2. An opening degree of an accelerator and a fuel injection in the engine 2 are controlled in accordance with a depression of an accelerator pedal (not shown) to generate a required torque. The engine 2 may be idled while stopping a fuel supply to the engine 2 by a fuel-cutoff control. In this case, an engine braking force may be generated by a power loss such as a pumping loss. For example, a permanent magnet synchronous motor, that is, a motor-generator may be used as the first motor 3, and the first motor 3 is operated mainly as a generator.

Figures 2, 3:
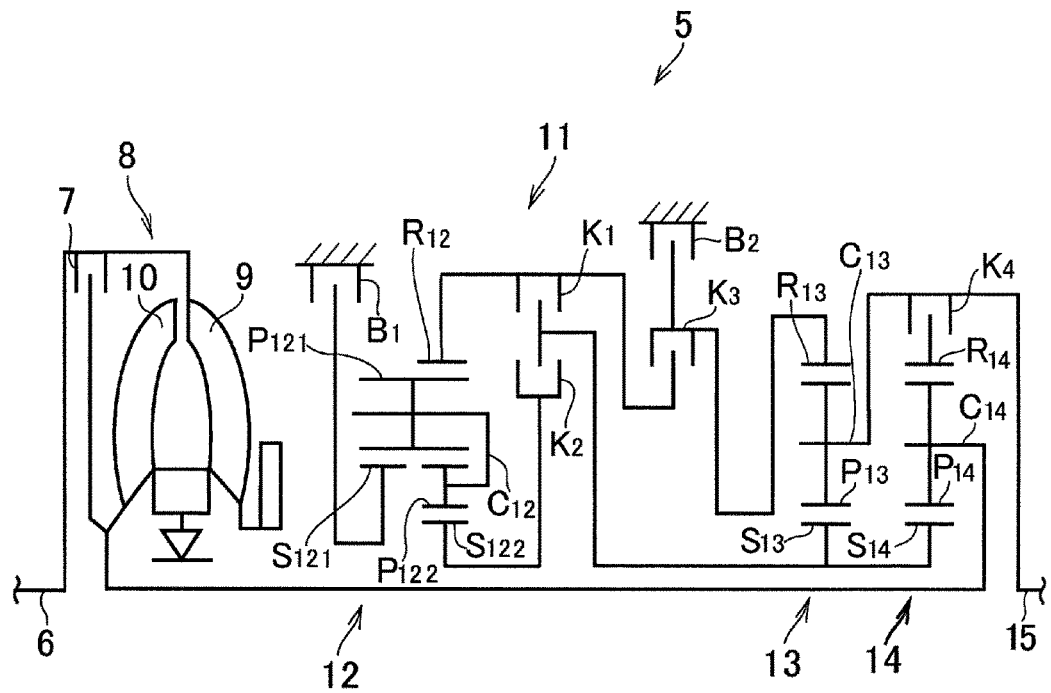
FIG. 2 is a skeleton diagram showing one example of a gear train of an automatic transmission arranged in the hybrid vehicle shown in FIG. 1.
FIG. 3 is a table showing engagement states of clutches and brakes in each gear stage of the transmission.

The transmission 5 comprises a plurality of engagement devices such as clutches and brakes, and a gear stage of the transmission 5 is shifted among a plurality of stages including a reverse stage by manipulating the engagement devices. Specifically, a forward stage of the transmission 5 may be selected from 10 stages. For example, an automatic transmission described in JP-A-2017-155779 may be adopted as the transmission 5. A structure of the transmission 5 is shown in FIG. 2 in more detail.

In the transmission 5, a torque converter 8 having a lockup clutch 7 is arranged in an input side of the transmission 5. The torque converter 8 includes a pump impeller 9 as an input element and a turbine runner 10 as an output element. The input shaft 6 is connected to the pump impeller 9, and the turbine runner 10 is connected to a geared transmission section 11. The torque converter 8 may be omitted as necessary, and the input shaft 6 may be connected directly to the geared transmission section 11.

The geared transmission section 11 comprises a Ravigneaux first planetary gear set 12, a single-pinion second planetary gear set 13, and a single-pinion third planetary gear set 14. The first planetary gear set 12 comprises a first sun gear S121, a second sun gear S122, a ring gear R12, a plurality of first pinion gears P121 interposed between the first sun gear S121 and the ring gear R12, a plurality of second pinion gears P122 interposed between the second sun gear S122 and the first pinion gears P121, and a carrier C12 supporting the first pinion gears P121 and the second pinion gears P122 in a rotatable manner. That is, the first planetary gear set 12 performs a differential action among the first sun gear S121, the second sun gear S122, the ring gear R12, and the carrier C12. The first planetary gear set 12 further comprises a first brake B1 that selectively stops a rotation of the first sun gear S121.

The second planetary gear set 13 and the third planetary gear set 14 are arranged coaxially with the first planetary gear set 12. The second planetary gear set 13 comprises a sun gear S13, a ring gear R13, a plurality of pinion gears P13 interposed between the sun gear S13 and the ring gear R13, and a carrier C13 supporting the pinion gears P13 in a rotatable manner. That is, the second planetary gear set 13 performs a differential action among the sun gear S13, the ring gear R13, and the carrier C13. Similarly, the third planetary gear set 14 comprises a sun gear S14, a ring gear R14, a plurality of pinion gears P14 interposed between the sun gear S14 and the ring gear R14, and a carrier C14 supporting the pinion gears P13 in a rotatable manner. That is, the third planetary gear set 14 performs a differential action among the sun gear S14, the ring gear R14, and the carrier C14.

The sun gear S13 of the second planetary gear set 13 is formed integrally with the sun gear S14 of the third planetary gear set 14, and a unit of the sun gear S13 and the sun gear S14 is connected selectively to the ring gear R12 by engaging a first clutch K1. The unit of the sun gear S13 and the sun gear S14 is also connected selectively to the second sun gear S122 of the first planetary gear set 12 by engaging a second clutch K2. The ring gear R13 of the second planetary gear set 13 is connected selectively to the ring gear R12 of the first planetary gear set 12 by engaging a third clutch K3. A rotation of the ring gear R13 of the second planetary gear set 13 is selectively stopped by engaging a second brake B2.

The carrier C14 of the third planetary gear set 14 is connected to the turbine runner 10 of the torque converter 8 to serve as an input element of the geared transmission section 11. The carrier C13 of the second planetary gear set 13 is connected to an output shaft 15 of the geared transmission section 11 (or the transmission 5) to serve as an output element, and the carrier C13 is connected selectively to the ring gear R14 of the third planetary gear set 14 by engaging a fourth clutch K4. When the fourth clutch K4 is in engagement, specifically, two of the rotary elements of the second planetary gear set 13 are connected to two of the rotary elements of the third planetary gear set 14 so that the second planetary gear set 13 and the third planetary gear set 14 are rotated integrally without performing a differential action.

A frictional engagement device that is actuated hydraulically and whose torque capacity can be changed continuously may be used respectively as the first clutch K1 to the fourth clutch K4, and the first brake B1 and the second brake B2.

Engagement states of the clutches K1 to K4, and the brakes B1 and B2 in each gear stage are shown in FIG. 3. As shown in FIG. 3, a forward stage of the transmission 5 may be selected from the 1st stage to the 10th stage, and a reverse stage (referred to as "Rev" in FIG. 3) is also available. In the table shown in FIG. 3, "O" represents engagement of the engagement device. Those engagement devices are actuated hydraulically, and a hydraulic control unit (not shown) for manipulating the engagement devices is operated electrically. A shifting operation of the transmission 5 is executed when an operating point of the vehicle 1 governed by a position of the accelerator pedal and a vehicle speed shifts across a shifting boundary defining regions of the gear stages in a shift map. Specifically, a target stage is determined based on a position of the accelerator pedal and a vehicle speed or a rotational speed of a predetermined rotary member corresponding to the vehicle speed, and the engagement devices are engaged and disengaged to establish the target stage. The gear stage may be shifted not only stage by stage, but also to the stage two or more stages higher or lower than the current stage. In a case of shifting the gear stage two or more stages higher or lower than the current stage, the gear stage may be shifted to the target stage via an interim stage.

Turning back to FIG. 1, the transmission 5 is connected to a rear differential gear unit 17 through a rear propeller shaft 16 so that the drive torque is distributed from the rear differential gear unit 17 to rear wheels 18. A transfer 19 is also disposed downstream of the transmission 5 so as to deliver output torque of the transmission 5 partially to front wheels 20 in a four-wheel drive mode. To this end, the transfer 19 is connected to a front differential gear unit 22 through a front propeller shaft 21 so that the torque is distributed from the front differential gear unit 22 to the front wheels 20.

For example, the transfer 19 may be a part-time transfer including a clutch (not shown) that selectively interrupt torque transmission to a gear train (not shown) for delivering torque to the front propeller shaft 21, a full-time transfer that always distributes torque to the front wheels 20 and the rear wheels 18 while allowing a differential rotation between the front wheels 20 and the rear wheels 18, and a full-time transfer that can selectively restrict a differential rotation between the front wheels 20 and the rear wheels 18.

A second motor (referred to as "MG2" in FIG. 1) 4 is connected to the transfer 19 to drive the front propeller shaft 21 (i.e., the front wheels 20). The second motor 4 is operated mainly as a motor to generate a drive torque to propel the vehicle 1, and hence a motor having a greater capacity than the first motor 3 is adopted as the second motor 4. In order to regenerate energy during deceleration, it is preferable to use a motor-generator such as a permanent magnet synchronous motor as the second motor 4. Specifically, the second motor 4 is connected to an output side of the transmission 5 through the transfer 19.

The first motor 3 and the second motor 4 are electrically connected with an electric storage device (referred to as "BATT" in FIG. 1) 23 such as a battery and a capacitor. In the vehicle 1, therefore, the first motor 3 and the second motor 4 may be operated individually as a motor by supplying electricity to those motors from the electric storage device 23, and electricity generated by the first motor 3 and the second motor 4 may be accumulated in the electric storage device 23. It is also possible to operate the second motor 4 as a motor by supplying electricity generated by the first motor 3 to the second motor 4 to propel the vehicle 1 by an output torque of the second motor 4.

The engine 2, the first motor 3, the second motor 4, the transfer 19 etc. are controlled by an electronic control unit (to be abbreviated as the "ECU" hereinafter) 24 as a controller. The ECU 24 is composed mainly of a microcomputer, and is configured to execute a calculation based on input data as well as data installed in advance, and transmits a calculation result in the form of command signal. The ECU 24 may also be formed by integrating an engine control unit, a motor control unit, a transmission control unit and so on.

Figure 4:
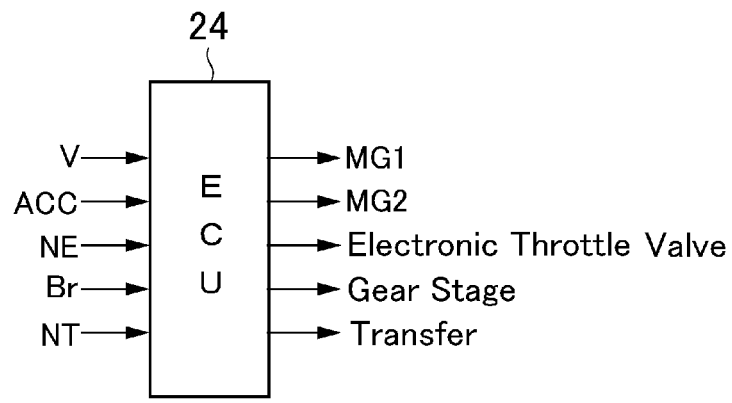
FIG. 4 is a block diagram showing input data and output commands to/from an electronic control unit.

As shown in FIG. 4, the ECU 24 receives data about; a vehicle speed V; an accelerator position ACC; a state of charge (to be abbreviated as the "SOC" hereinafter) level of the electric storage device 23; an engine speed Ne; an activation signal Br of the brake; a rotational speed of the input shaft 6 and so on. The ECU 24 transmits command signals for controlling the first motor 3, the second motor 4, an electronic throttle valve of the engine 2, the gear stage of the transmission 5, the transfer 19 and so on.

An operating condition of the transmission 5, that is, a gear stage of the transmission 5 may be controlled electrically. For example, when the vehicle is powered by the engine 2 or the first motor 3, the gear stage of the transmission 5 is selected in such a manner as to achieve a required drive force and fuel efficiency. Specifically, the gear stage of the transmission 5 is selected based on the vehicle speed V and the accelerator position ACC with reference to the shift map, and the clutches K1 to K4 and the brakes B1 and B2 are manipulated in such a manner as to establish the selected gear stage. In addition, an operating mode of the vehicle 1 is also selected in such a manner as to achieve a required drive force and fuel efficiency. For example, when coasting or decelerating the vehicle 1, the engine 2 and the first motor 3 are stopped and disconnected from the front wheels 20 and the rear wheels 18 so as to reduce a running resistance. The engine 2 and the first motor 3 are also disconnected from the front wheels 20 and the rear wheels 18 to reduce a running resistance in an electric vehicle mode (i.e., EV mode). In order to disconnect the engine 2 and the first motor 3 from the front wheels 20 and the rear wheels 18, the geared transmission section 11 is brought into a neutral stage. As described, in the transmission 5, the gear stage is established by engaging any three of the engagement devices. That is, the transmission 5 is brought into the neutral stage if only any two of the engagement devices are engaged, and in the neutral stage, any of the rotary elements is idled and the torque will not be transmitted through the transmission 5. However, a power loss would be caused as a result of rotating said rotary member to be idled. In order to avoid such power loss resulting from an idling of the rotary element in the geared transmission section 11, according to the embodiment of the present disclosure, the engine 2 and the first motor 3 are disconnected from the front wheels 20 and the rear wheels 18 by disengaging all of the engagement devices in the geared transmission section 11.

For example, in the geared transmission section 11, all of the engagement devices are disengaged when driving force or braking force is not required during propulsion of the vehicle 1. That is, when the required driving force is increased or when an engine braking force is required, a predetermined gear stage is established in the transmission 5. As described, the gear stage of the transmission 5 is selected in accordance with an operating data of the vehicle 1 including a current vehicle speed with reference to the shift map. Specifically, when establishing a predetermined gear stage in the conventional vehicles propelling in the neutral stage, an initial gear stage is set based on an operating data such as a current vehicle speed, and then the gear stage is shifted from the initial stage to a target stage set based on a required acceleration or deceleration. On the other hand, the control system according to the embodiment of the present disclosure executes the routine shown in FIG. 5 when establishing a target stage during propulsion while disengaging all of the engagement devices.

Figure 5:
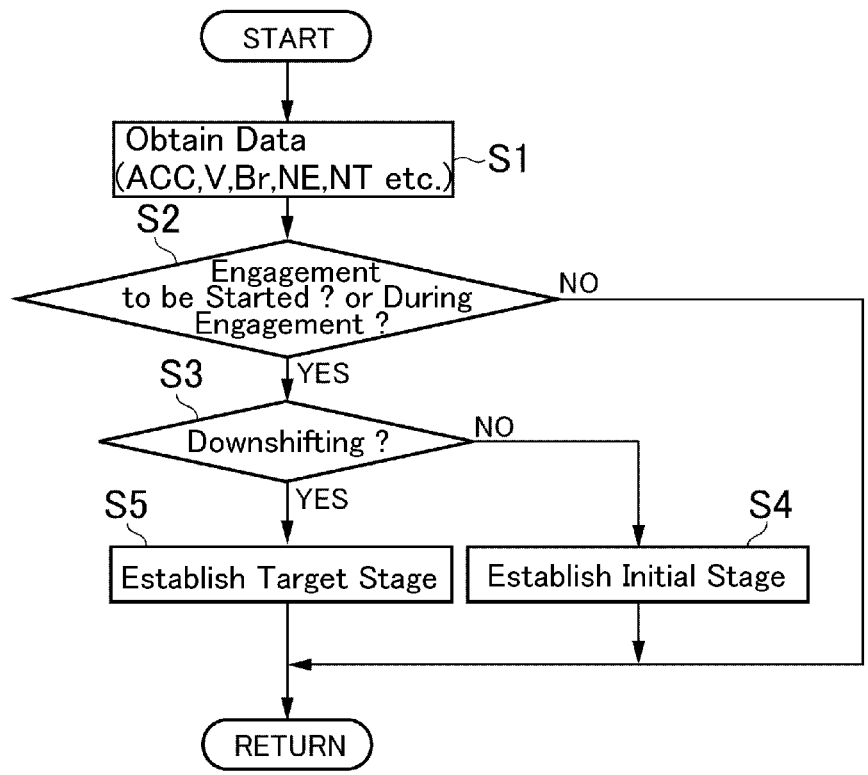
FIG. 5 is a flowchart showing one example of a routine to be executed by the shift control system according to the embodiment of the present disclosure.

The routine shown in FIG. 5 is performed by the ECU 24 repeatedly at predetermined time intervals during propulsion while disengaging all of the engagement devices.

At step S1, data about an accelerator position ACC, a vehicle speed V, an activation signal Br of the brake, an engine speed Ne etc. are obtained. Then, it is determined at step S2 whether a condition to start engagement of the engagement devices is satisfied or the engagement devices are being engaged, based on the data obtained at step S1. When the accelerator pedal is depressed to accelerate the vehicle 1 (i.e., to increase the driving force) during propulsion while disengaging all of the engagement devices, or when a brake pedal (not shown) is depressed to decelerate the vehicle 1 (i.e., to brake the vehicle 1) during propulsion while disengaging all of the engagement devices, it is necessary to connect the engine 2 and the first motor 3 to the front wheels 20 and the rear wheels 18. At step S2, specifically, such acceleration demand or deceleration demand is determined. If the driver does not intend to accelerate or decelerate the vehicle so that the answer of step S2 is NO, the routine returns without carrying out any specific control. By contrast, if the driver intends to accelerate or decelerate the vehicle so that the answer of step S2 is YES, the routine progresses to step S3 to determine whether the downshifting is required. As described later, the answer of step S2 will be YES if the determination at step S2 is executed during execution of the engagement operation of the engagement device.

As described, the routine shown in FIG. 5 is executed during propulsion of the vehicle 1. Therefore, if the answer of step S2 is YES, an initial stage may be computed based on the operating data including the vehicle speed V of immediately before the determination at step S2. For example, given that the vehicle 1 propels on a flat road at a legal speed and that a depression of the accelerator pedal is substantially zero, the initial stage is set to the highest gear stage. In the vehicle 1, specifically, the initial stage is set to the 10th stage. Otherwise, given that an accelerating operation or a decelerating operation is executed so that the answer of step S2 is YES, a target stage is computed to achieve a required acceleration or deceleration. For example, in a case that the accelerator pedal is depressed, a required driving force governed by a current (or target) depression of the accelerator pedal is calculated based on a depressing speed of the accelerator or a pedal force applied to the accelerator pedal, and the target stage is computed based on the required driving force and the vehicle speed. At step S3, the initial stage and the target stage thus determined are compared to each other, and if the target stage is lower than the initial stage, the answer of step S3 will be YES.

If the required driving force is small, or if a required braking force to be established by the prime mover is small, the gear stage determined based on the operating data including the current vehicle speed V will not be changed from the initial stage, and hence the answer of step S3 will be NO. That is, if an operation to engage the engagement devices during propulsion while disengaging all of the engagement devices so as to establish any of the gear stage is not the downshifting operation so that the answer of step S3 is NO, the routine progresses to step S4 to engage the engagement devices in such a manner as to establish the initial stage. Thereafter, the routine returns. For example, if the initial stage is set to the 10th stage, the second clutch K2, the third clutch K3, and the first brake B1 are engaged in the transmission 5 at step S4.

By contrast, if the answer of step S3 is YES, the routine progresses to step S5 to engage the engagement devices in such a manner as to establish the target stage, and thereafter, the routine returns. In this case, the target stage is established in the transmission 5 directly without establishing the initial stage by engaging the engagement devices. For example, if the required driving force is large and hence the target stage is set to the 4th stage, the fourth clutch K4, the first brake B1, and the second brake B4 are engaged, and the remaining engagement devices are disengaged.

Figure 6A:
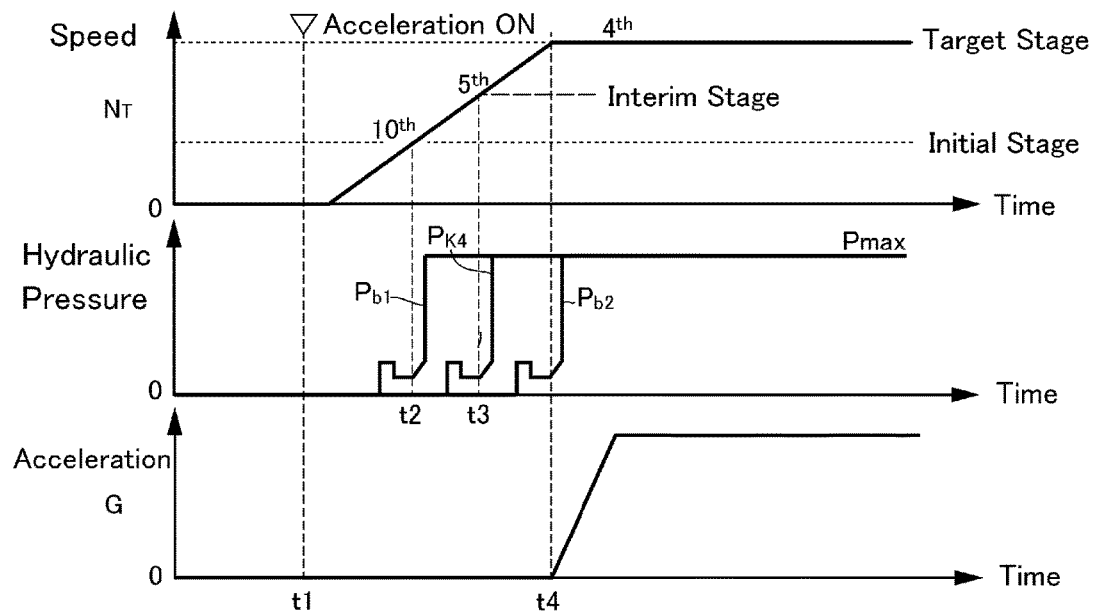
FIG. 6A is a time chart showing temporal changes in an input speed, engagement pressures, and an acceleration during execution of the routine shown in FIG. 5.

FIG. 6A shows temporal changes in an input speed NT to the transmission 5 (or an engine speed NE), engagement pressures, and an acceleration G in the case that the target stage is established directly during propulsion while disengaging all of the engagement devices. Before point t1, the vehicle 1 propels while stopping the engine 2 and disengaging all of the engagement devices. When the accelerator pedal is depressed at point t1 (indicated as "Accelerator ON"), the engine 2 is cranked by the first motor 3 to be started, and the engine speed NE is increased gradually. In the example shown in FIGS. 6A and 6B, the target stage is set to the 4th stage, and the engagement devices for establishing the 4th stage are engaged in sequence.

A speed ratio in the 4th stage is greater than "1", and a synchronous speed of the input speed NT in the 4th stage becomes a speed calculated by multiplying an output speed (i.e., a speed of the output shaft of the transmission 5) corresponding to the vehicle speed V in the 4th stage by the speed ratio in the 4th stage. That is, the synchronous speed of the input speed NT in the 4th stage is rather high, therefore, the engagement operation of the engagement devices is commenced when the input speed NT is increased to a certain level. For example, the engagement operation of the engagement devices is executed by the conventional method such as a fast fill method to reduce a clearance in the first brake B1 by transmitting a predetermined hydraulic command Pb1 as indicated in FIG. 6A. Then, the hydraulic command Pb1 is reduced to bring the first brake B1 into a low-pressure (or steady pressure) standby mode. Thereafter, the hydraulic command Pb1 is increased to engage the first brake B1 at point t2 when the input speed Nt is increased to a level of a synchronous speed in the 10th stage. In this situation, since the clearance in the first brake B1 has already been reduced (or packed), a strong shock will not be caused even if the hydraulic command Pb1 is increased rapidly. When or immediately after the engagement pressure of the first brake B1 is increased to a predetermined pressure Pmax at which the first brake B1 is engaged completely, an engagement operation of the fourth clutch K4 is commenced. Specifically, the fourth clutch K4 is also engaged by the same procedures as the engagement operation of the first brake B1.

When the input speed Nt is increased to a level of a synchronous speed in the 5th stage as an interim stage at point t3, a hydraulic command Pk4 is increased to engage the fourth clutch K4 completely. In this situation, since the clearance in the fourth clutch K4 has already been reduced (or packed), a strong shock will not be caused even if the hydraulic command Pk4 is increased rapidly. Then, an engagement operation of the second brake B2 is executed by the same procedures as the engagement operations of the first brake B1 and the fourth clutch K4. When the input speed Nt is increased to a level of a synchronous speed in the 4th stage as the target stage at point t4, a hydraulic command Pb2 is increased to engage the second brake B2 completely. In this situation, since the clearance in the second brake B2 has already been reduced (or packed), and the input speed Nt has been substantially synchronized with the synchronous speed in the 4th stage, a strong shock will not be caused even if the hydraulic command Pb2 is increased rapidly.

In this case, the first brake B1, the fourth clutch K4, and the second brake B2 are engaged to establish the 4th stage almost at the same time when the input speed NT reaches the synchronous speed in the 4th stage. Consequently, the vehicle 1 is propelled by the torque of the engine 2 multiplied by the speed ratio in the 4th stage, and the acceleration G is increased from point t4. In this case, therefore, the driver is allowed to sense an increase in the acceleration G almost at the same time with a commencement of increase in the acceleration G. That is, a period from point t1 to point t4 is an unconscious period or an acceleration delay of this case. Such unconscious period is a required time to increase the input speed NT smoothly at a predetermined rate as indicated in FIG. 6A, but the unconscious period of this case is very short.

Figure 6B:
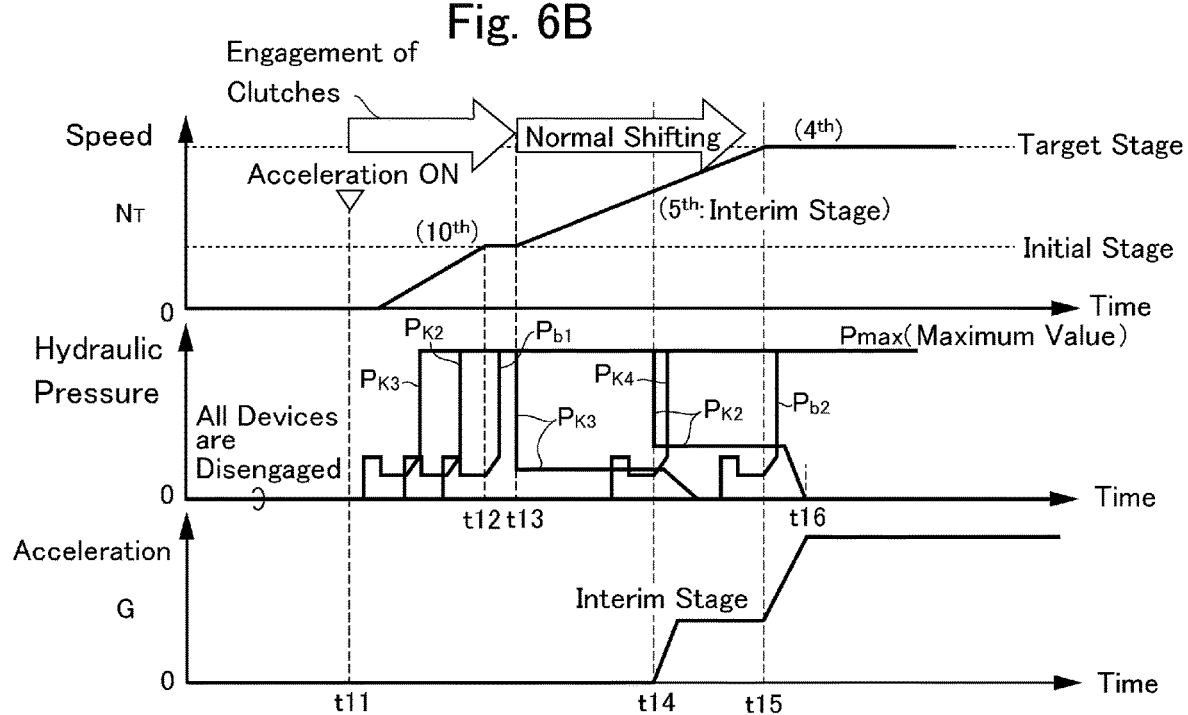
FIG. 6B shows temporal changes in the input speed, the engagement pressures, and the acceleration during execution of a normal shifting operation.

On the other hand, FIG. 6B shows temporal changes in the input speed NT, the engagement pressures, and the acceleration G in the case that the target stage is established via the initial stage by the conventional method during propulsion while disengaging all of the engagement devices. Before point t11, the vehicle 1 propels while stopping the engine 2 and disengaging all of the engagement devices of the transmission 5. When the accelerator pedal is depressed at point t11, the engine 2 is cranked by the first motor 3 to be started, and a predetermined gear stage is to be established in the transmission 5. According to the conventional method, the initial stage is set based on the operating data including the current vehicle speed V.

At point t11, the vehicle 1 propels at a legal speed, and the accelerator position ACC starts increasing. In this situation, therefore, the initial stage is set to the 10th stage based on such operating data. Consequently, an operation to establish the 10th stage is commenced immediately after point t11. As indicated in FIG. 3, the 10th stage is established by engaging the third clutch K3, the second clutch K2, and the first brake B1. To this end, hydraulic commands PK3, Pk2, and Pb1 are transmitted to engage the third clutch K3, the second clutch K2, and the first brake B1 in order. As the case shown in FIG. 6A, those engagement devices are also engaged by the fast fill method including a clearance packing, a shifting to the low-pressure (or steady pressure) standby mode, and a pressure rising to the predetermined pressure Pmax. The 10th stage is established as a result of establishing a torque capacity by the first brake B1 as the third engagement device to be engaged. Therefore, the hydraulic command Pb1 is increased to engage the first brake B1 completely when the input speed NT almost reaches the synchronous speed in the 10th stage at point t12.

After thus establishing the 10th stage as the initial stage, a normal shifting operation to the 4th stage as the target stage is executed. In this case, in order to expedite establishment of the acceleration G, the gear stage is shifted to the 4th stage via the 5th stage as an interim stage. As indicated in FIG. 3, the 5th stage is established by engaging the second clutch K2, the fourth clutch K4, and the first brake B1. In this situation, first of all, the third clutch K3 is disengaged and then the fourth clutch K4 is engaged. Specifically, when the establishment of the 10th stage is detected at point t13, the hydraulic pressure applied to the third clutch K3 is reduced to a level possible to transmit the torque being applied to the third clutch K3. Specifically, the vehicle 1 substantially propels in the 10th stage in this situation, therefore, the hydraulic pressure applied to the third clutch K3 is maintained to a level possible to maintain the driving force to propel the vehicle 1 without the vehicle 1 being decelerated by a road load. In this situation, an engagement operation of the fourth clutch K4 is commenced before the input speed NT reaches a synchronous speed in the 5th stage.

As the foregoing engagement devices, those engagement devices are also engaged by the fast fill method including the clearance packing, the shifting to the low-pressure (or steady pressure) standby mode, and the pressure rising to the predetermined pressure Pmax. Specifically, when the input speed NT almost reaches a synchronous speed in the 5th stage at point t14, the hydraulic command Pk4 is increased to engage the fourth clutch K4 completely. At the same time, disengagement of the second clutch K2 is commenced. Specifically, as the case of disengaging the third clutch K3, the hydraulic pressure applied to the second clutch K2 is reduced to a level possible to maintain a torque transmitting capacity for transmitting the torque being applied to the second clutch K2, and then maintained to said level. At point t14, the 5th stage is substantially established so that the driving force for propelling the vehicle 1 is governed by the speed ratio in the 10th stage, and consequently, the acceleration G starts increasing.

In this situation, since the torque transmitting capacity of the second clutch K2 is maintained, the acceleration G or the driving force is maintained in the 5th stage, and a shifting operation to the 4th stage, that is, an engagement of the second brake B2 is commenced. As the foregoing engagement devices, the hydraulic command Pb2 is also controlled to engage the second brake B2 by the fast fill method including the clearance packing, the shifting to the low-pressure (or steady pressure) standby mode, and the pressure rising to the predetermined pressure Pmax. Specifically, when the input speed NT almost reaches a synchronous speed in the 4th stage at point US, the hydraulic command Pb2 is increased to engage the second brake B2 completely. After engaging the second brake B2 completely, the hydraulic command Pb2 is reduced to zero, and the shifting operation to the target stage is completed.

According to the conventional shifting operation shown in FIG. 6B, the acceleration G is not increased during period from point t11 at which the accelerator pedal is depressed to point t14 at which the 5th stage as the interim stage is established. That is, the period from point t11 to point t14 is the unconscious period in which the driver is not allowed to sense an increase in the acceleration G. In this case, the unconscious period includes a required period of time to temporarily establish the 10th stage as the initial stage, and hence the unconscious period of this case is longer than the unconscious period shown in FIG. 6A. In addition, the period of time from point t11 to point t15 required to manipulate the engagement devices to establish the target stage is longer than the period of time from point t1 to point t4 shown in FIG. 6A to manipulate the engagement devices to establish the target stage. Thus, according to the embodiment of the present disclosure, it is possible to reduce a required period of time until the acceleration G or the driving force is increased by establishing the target stage during propulsion while disengaging all of the engagement devices. That is, an acceleration response can be improved. In addition, number of engagement devices to be engaged is small and the input speed is varied continuously, therefore, the shift shock may be reduced.

Figure 7:
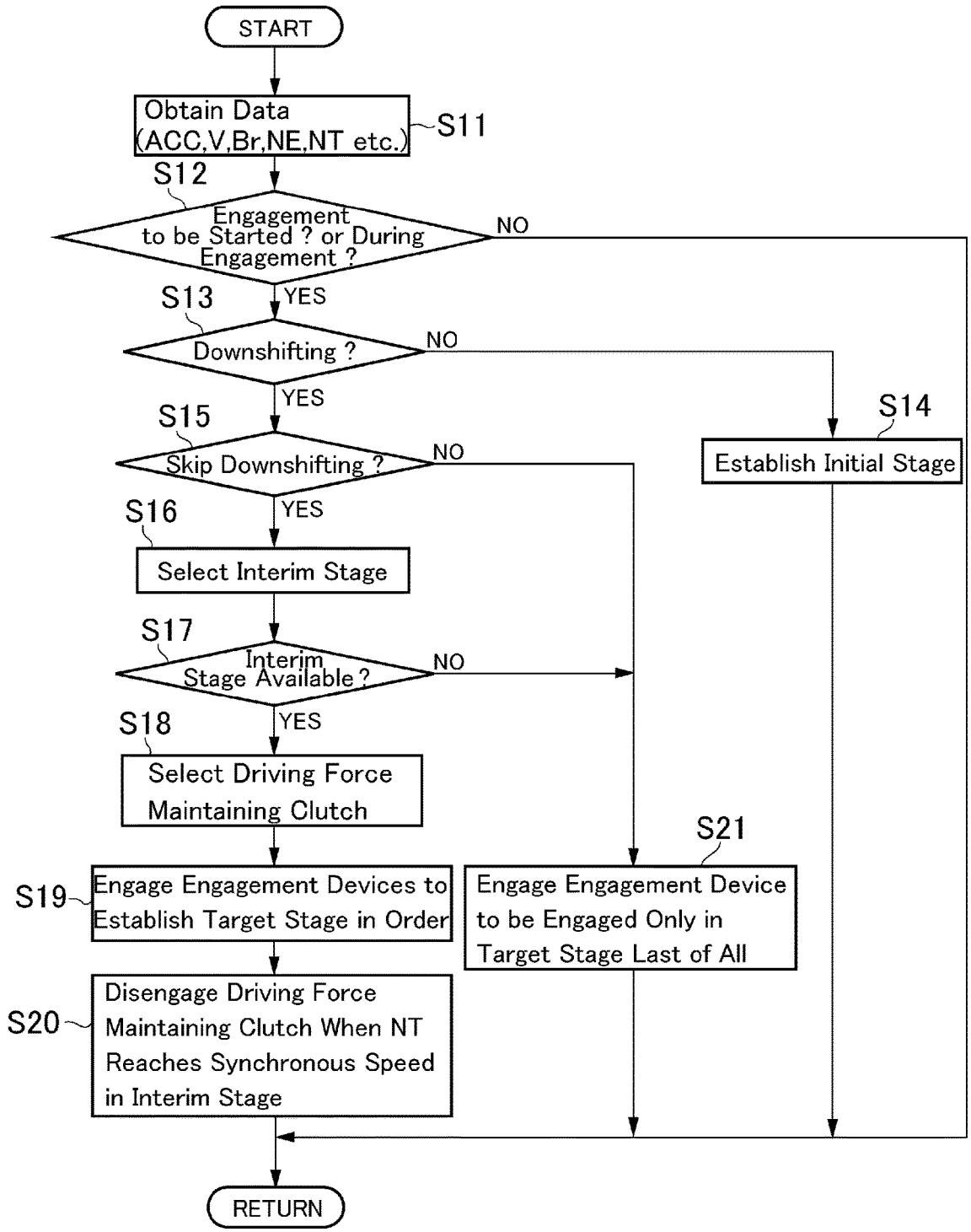
FIG. 7 is a flowchart showing another example of a routine to be executed by the shift control system according to the embodiment of the present disclosure.

FIG. 7 shows another example of the routine for executing the downshifting to the target stage set to two or more stages lower than the current stage via the interim stage higher than the current stage. As the routine shown in FIG. 5, at step S11, data about the accelerator position ACC, the vehicle speed V, the activation signal Br of the brake, the engine speed Ne etc. are also obtained. Then, it is also determined at step S12 whether the condition to start engagement of the engagement devices is satisfied or the engagement devices are being engaged, based on the data obtained at step S11. Thereafter, it is also determined at step S13 to determine whether the downshifting is required. If the answer of step S13 is NO, the routine also progressed to step S14 to engage the engagement devices to establish the initial stage.

By contrast, if the answer of step S13 is YES, the routine progresses to step S15 to determine whether a skip downshifting is required to shift the gear stage from the initial stage to the target stage while skipping an intermediate stage(s). If a change rate of the accelerator position ACC is high, or if a depression of the accelerator pedal is large so that the answer of step S15 is YES, the routine progresses to step S16 to select an interim stage satisfying the following conditions.

The target stage is set in response to an operation of the accelerator. That is, the target stage may be changed during the shifting operation if the accelerator is operated again. Therefore, the initial stage is set based on the operating data including the vehicle speed V at the point when the determination to engage any of the engagement device is made during propulsion while disengaging all of the engagement devices. In the initial stage, the gear stage possible to be shifted from the initial stage by disengaging only one engagement device and engaging only one engagement device is set as the interim stage. That is, the interim stage is a gear stage possible to be shifted from the current stage by disengaging only one engagement device and engaging only one engagement device. Therefore, the gear stage can be shifted from the current stage (e.g., the initial stage) to the interim stage by the conventional clutch-to-clutch shifting method. In addition, if the accelerator pedal is returned and hence the target stage is changed to the initial stage or the gear stage close to the initial stage, the gear stage may be shifted promptly to the target gear stage thus changed, or the target stage may be set promptly.

Figures 8, 9, 10:
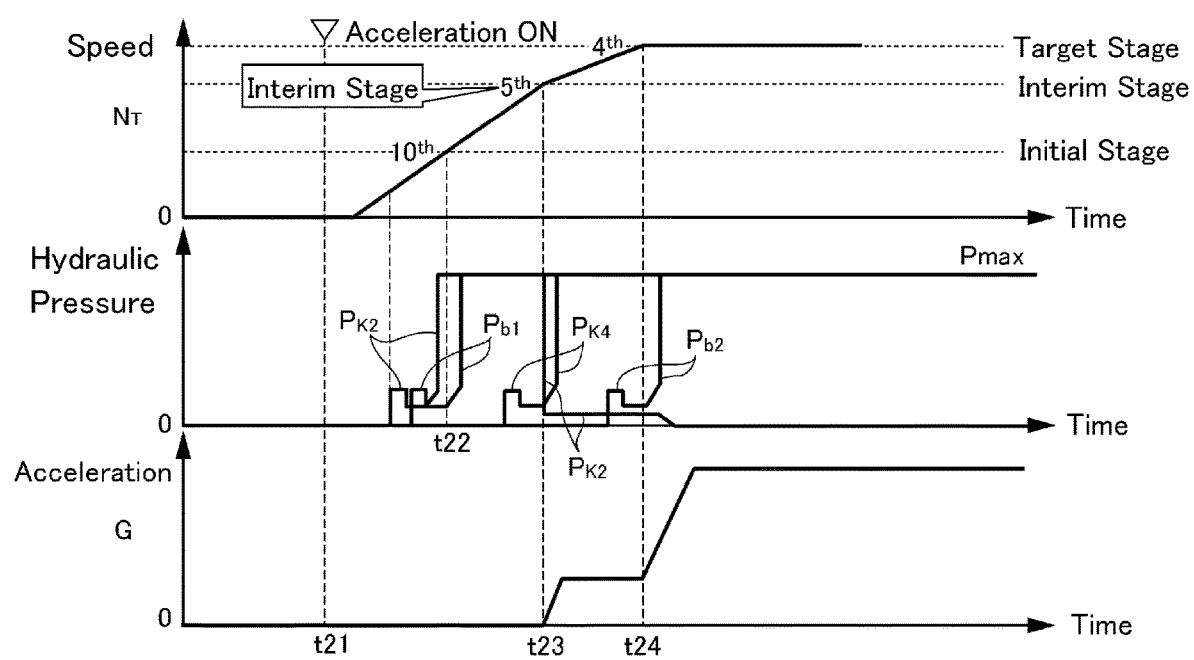
FIG. 8 is a table showing engagement states of engagement devices in interim stages.
FIG. 9 is a table showing an order of engaging the engagement devices in a case of establishing the fourth stage via the fifth stage during propulsion while disengaging all of the engagement devices.
FIG. 10 is a time chart showing temporal changes in the input speed, the engagement pressures, and the acceleration during execution of steps S18 to S20 shown in FIG. 7.

If such interim stage is not available, the routine progresses to step S17. By contrast, if one gear stage is available to be shifted from the initial stage by disengaging one of the engagement devices while disengaging another one of the engagement devices, such gear stage is set as the interim stage. If more than one stage is available to be shifted from the initial stage by disengaging one of the engagement devices while disengaging another one of the engagement devices, the gear stage closer or closest to the target stage is selected as the interim stage. FIG. 8 shows engagement states of the engagement devices in a case that the initial stage is set to the 10th stage, and the target stage is set to the 4th stage. In this case, the gear stage can be shifted from the 10th stage as the initial stage to the 8th by disengaging the second clutch K2 and engaging the fourth clutch K4. That is, the 8th stage is one of the options of the interim stage.

However, the gear stage may also be shifted from the 10th stage to the 5th stage by disengaging the third clutch K3 and engaging the fourth clutch K4. That is, the 5th stage is another one of the options of the interim stage. In this case, therefore, the 5th stage which is closer to the 4th stage as the target stage than the 8th stage is selected as the interim stage at step S16. If the initial stage and the target are different from the 10th stage and the 4th stage, the interim stage may be selected by the same principle. Here, as shown in FIG. 8, the operating mode in which all of the engagement devices are disengaged is the EV mode.

Then, at step S17, an availability of the interim stage is determined. If the interim stage has been set or selected at step S16 so that the answer of step S17 is YES, the routine progresses to step S18 to select the engagement device for generating the driving force in the interim stage. Specifically, the engagement device for generating the driving force in the interim stage is the engagement device engaged in the initial stage and the interim stage, and disengaged in the target stage. For example, in the case that the initial stage is set to the 10th stage, the interim stage is set to the 5th stage, and the target stage is set to the 4th stage, the second clutch K2 serves as the engagement device for generating the driving force in the interim stage. The engagement states of the engagement devices in this case are indicated in FIG. 9, and in FIG. 9, "O" represents engagement of the engagement device and blank represents disengagement of the engagement device.

As can be seen from FIG. 9, the second clutch K2 and the first brake B1 are engaged in both of the 10th stage as the initial stage and the 5th stage as the interim stage, but the second clutch K2 is disengaged in the 4th stage. In this case, therefore, the second clutch K2 serves as the engagement device for generating the driving force in the interim stage. In the following explanation, the engagement device selected at step S18 will be called "the driving force maintaining clutch".

After thus selecting the driving force maintaining clutch, at step S19, engagement operations of the engagement devices are executed to establish the target stage. At step S19, an engagement operation to engage the driving force maintaining clutch is commenced first of all, and engagement operations to engage the remaining engagement devices are executed in order indicated in FIG. 9. Specifically, the engagement device engaged in all of the initial stage, the interim stage, and the target stage is engaged secondly, the engagement device engaged in the interim stage and the target stage is engaged thirdly, and the engagement device engaged only in the target stage is engaged fourthly. That is, in the example shown in FIG. 9, the first brake B1, the fourth clutch K4, and the second brake B2 are engaged in order. Here, in a case of establishing the 4th stage during propulsion while disengaging all of the engagement devices, all of the engagement devices indicated as "O" will not be engaged, but only the engagement devices whose engagement order are indicated in FIG. 9 are engaged.

As a result of executing the engagement operations at step S19, the driving force maintaining clutch which is to be disengaged in the target stage is engaged so that the interim stage is established temporarily in the process of establishing the target stage. Then, when it is detected that the input speed NT to the transmission 5 reaches the synchronous speed in the interim stage, the driving force maintaining clutch (i.e., the second clutch K2) is disengaged gradually at step S20, and thereafter, the routine returns. In this situation, the torque transmitting capacity of the driving force maintaining clutch will not be reduced immediately to zero. Specifically, the torque transmitting capacity of the driving force maintaining clutch is temporarily reduced to the level possible to maintain the driving force in the interim stage, and then reduced to zero by gradually disengaging the driving force maintaining clutch with the progress of the shifting operation. Consequently, the driving force of the acceleration G that has not been generated during propulsion while disengaging all of the engagement devices is increased in accordance with the speed ratio in the interim stage, and is further increased continuously in accordance with the speed ratio in the target stage. For this reason, the control response or the acceleration response can be improved while reducing the shift shock.

FIG. 10 shows temporal changes in the input speed NT to the transmission 5 (or an engine speed NE), engagement pressures, and the acceleration G in the case of executing steps S18 to S20. Before point t21, the vehicle 1 propels while stopping the engine 2 and disengaging all of the engagement devices. When the accelerator pedal is depressed at point t21 (indicated as "Accelerator ON"), the engine 2 is cranked by the first motor 3 to be started, and the engine speed NE is increased gradually. Immediately thereafter, the engagement operation to engage the second clutch K2 as the driving force maintaining clutch is commenced, and thereafter the engagement operation to engage the first brake B1 is commenced.

As the foregoing examples, the hydraulic commands Pk2 and Pb1 are respectively increased temporarily by the fast fill method, and then reduced to the standby level and increased again to engage the second clutch K2 and the first brake B1 respectively. Specifically, when the input speed NT almost reaches a synchronous speed in the 10th stage at point t22, the hydraulic command Pb1 is increased to engage the first brake B1 completely. Then, the engagement operation to engage the fourth clutch K4 is commenced, and when the input speed NT almost reaches a synchronous speed in the 5th stage at point t23, the hydraulic command Pk4 is increased to engage the fourth clutch K4 completely. Consequently, the 5th stage is established temporarily so that the driving force or the acceleration G is increased in accordance with the speed ratio in the 5th stage.

At the same time, the torque transmitting capacity of the second clutch K2 as the driving force maintaining clutch is reduced. In this situation, the hydraulic command Pk2 will not be reduced immediately to zero. Specifically, the torque transmitting capacity of the second clutch K2 is temporarily reduced to the level possible to maintain the driving force in the 5th stage. At the same time, engagement of the second brake B2 is commenced. In this situation, the driving force is generated in accordance with a speed ratio in the 5th stage, and the gear stage is further shifted from the 5th stage to the 4th stage by the clutch-to-clutch shifting method. Therefore, an increasing rate of the input speed is slightly reduced. Then, when the input speed NT almost reaches the synchronous speed in the 4th stage as the target stage at point t24, the hydraulic command Pb2 is increased to engage the second brake B2 completely. Immediately thereafter, the hydraulic command Pk2 is reduced to zero to disengage the second clutch K2. Consequently, the shifting operation to the 4th stage is completed so that the acceleration G is increased in accordance with the speed ratio in the 4th stage. By thus controlling the engagement devices, the torque transmitting capacity of the second clutch K2 may be maintained to a value greater than zero, until the input speed NT is increased from the synchronous speed in the 5th stage as the interim stage to the synchronous speed in the 4th stage as the target stage.

During execution of the above-explained control, the acceleration G starts increasing when the interim stage is established temporarily at point t23 without waiting for the completion of the shifting operation to the 4th stage as the target stage, and the driver is allowed to sense such increase in the acceleration G. That is, the unconscious period from the point at which the accelerator pedal is depressed to the point at which the driver starts sensing the increase in the acceleration G is reduced. For this reason, the control response or the acceleration response can be improved.

Turning back to FIG. 7, if the answer of step S15 or S17 is NO, the routine progresses to step S21 to shift the gear stage stepwise to the target stage via the intermediate stage(s), by engaging the engagement devices in a predetermined order in which the engagement device to be engaged to establish the target stage is engaged last of all. For example, in a case of shifting from the 9th stage to the 7th stage via the 8th stage, the engagement devices are engaged in the order shown in FIG. 11. As can be seen from FIG. 11, in the engagement devices to be engaged to establish the 7th stage as the target stage, the third clutch K3 is engaged in all of the gear stages from 9th stage to the 7th stage. Therefore, an engagement operation of the third clutch K3 is commenced first of all. Accordingly, the third clutch K3 corresponds to a first engagement device of the embodiment. In turn, the fourth clutch K4 is engaged in the 8th stage and the 7th stage. Therefore, an engagement operation of the fourth clutch K4 is commenced next. Accordingly, the fourth clutch K4 corresponds to a second engagement device of the embodiment. An engagement operation of the remaining clutch such as the first clutch K1 is engaged last of all. Accordingly, the first clutch K1 corresponds to a third engagement device of the embodiment.

Figure 11:
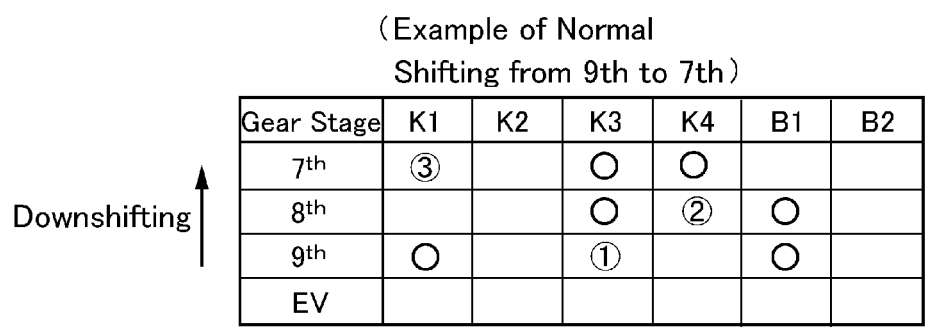
FIG. 11 is a table showing an order of engaging the engagement devices in a case of shifting the gear stage stepwise from the 9th stage as the initial stage to the 7th stage as the target stage via the 8th stage.

In other words, in order to shift the gear stage from the 9th stage to the 7th stage via the 8th stage, the first clutch K1 is engaged in the latest phase, and the fourth clutch K4 is engaged in the second latest phase. In FIG. 11, "O" represents engagement of the engagement device in each gear stage, and the numbers in the circles represent an order of the engagement devices to be actually engaged to establish the target stage. That is, the engagement devices indicated as "O" will not be engaged to establish the 7th stage as the target stage from the 9th stage as the initial stage set during propulsion while disengaging all of the engagement devices.

Even if the order of engaging the engagement devices to shift the gear stage from the initial stage to the target stage via the intermediate stage, the engagement orders of some of the engagement devices to be engaged may be set to the same order. In this case, the engagement devices set to the same orders are not engaged simultaneously, and engaged at different timings in an arbitrary order.

What is claimed is:

1. A shift control system for a vehicle having an automatic transmission in which a gear stage is selected from a plurality of stages by manipulating a plurality of engagement devices, and which is connected to an output side of a prime mover, comprising:
a controller that controls engagement and disengagement of the engagement devices,
wherein the controller is configured to
compute a target stage based on an operating data including a vehicle speed,
determine whether the target stage computed during propulsion while disengaging all of the engagement devices is lower than an initial stage computed based on the operating data immediately before the target stage is computed, and
engage the engagement devices to establish the target stage without establishing the initial stage, when the target stage is lower than the initial stage.

2. The shift control system for the vehicle as claimed in claim 1, wherein the controller is further configured to
compute an interim stage, in which a speed ratio is greater than the speed ratio in the initial stage but smaller than the speed ratio in the target stage, which can be shifted from the initial stage by engaging one of the engagement devices and disengaging another one of the engagement devices, and which can be shifted to the target stage by engaging one of the engagement devices and disengaging another one of the engagement devices, and
engage the engagement device to establish the interim stage in the process of establishing the target stage during propulsion while disengaging all of the engagement devices, if the interim stage is available.

3. The shift control system for the vehicle as claimed in claim 2, wherein the controller is further configured to select the interim stage in which a speed ratio is closer to a speed ratio of the target stage if a plurality of the interim stages is available.

4. The control system for the vehicle as claimed in claim 3, wherein the controller is further configured to engage the engagement devices to shift the gear stage from the initial stage to the target stage via an intermediate stage during propulsion while disengaging all of the engagement devices, in the order of:
a first engagement device that is engaged in all of the initial stage, the intermediate stage, and the target stage;
a second engagement device that is engaged in the intermediate stage and the target stage; and
a third engagement device that is engaged only in the target stage when shifting the gear stage from the intermediate stage.

5. The control system for the vehicle as claimed in claim 4, wherein the controller is further configured to engage the engagement devices to shift the gear stage from the initial stage to the target stage via the intermediate stage at different timings, if orders of some of the engagement devices are set to the same order.

6. The control system for the vehicle as claimed in claim 3, wherein the controller is further configured to
obtain an input speed to the automatic transmission,
engage a driving force maintaining clutch that is engaged in the interim stage but to be disengaged in the target stage, and
maintain a predetermined torque transmitting capacity of the driving force maintaining clutch during increasing the input speed from a synchronous speed in the interim stage to a synchronous speed in the target stage.

7. The control system for the vehicle as claimed in claim 2, wherein the controller is further configured to engage the engagement devices to shift the gear stage from the initial stage to the target stage via an intermediate stage during propulsion while disengaging all of the engagement devices, in the order of:
a first engagement device that is engaged in all of the initial stage, the intermediate stage, and the target stage;
a second engagement device that is engaged in the intermediate stage and the target stage; and a third engagement device that is engaged only in the target stage when shifting the gear stage from the intermediate stage.

8. The control system for the vehicle as claimed in claim 7, wherein the controller is further configured to engage the engagement devices to shift the gear stage from the initial stage to the target stage via the intermediate stage at different timings, if orders of some of the engagement devices are set to the same order.

9. The control system for the vehicle as claimed in claim 2, wherein the controller is further configured to
obtain an input speed to the automatic transmission,
engage a driving force maintaining clutch that is engaged in the interim stage but to be disengaged in the target stage, and
maintain a predetermined torque transmitting capacity of the driving force maintaining clutch during increasing the input speed from a synchronous speed in the interim stage to a synchronous speed in the target stage.

* * * * *